United States Patent [19]

Yokoi et al.

[11] 4,274,306
[45] Jun. 23, 1981

[54] VEHICLE TRANSMISSION SHIFT CONTROL APPARATUS

[75] Inventors: Takeshi Yokoi; Noritaka Yanagihara, both of Toyota, Japan

[73] Assignee: Toyota Jidosha Kogyo Kabushiki Kaisha, Toyota, Japan

[21] Appl. No.: 39,609

[22] Filed: May 16, 1979

[30] Foreign Application Priority Data

Aug. 30, 1978 [JP] Japan ............................. 53-105828

[51] Int. Cl.³ ....................... B60K 41/10; B60K 41/06
[52] U.S. Cl. ......................................... 74/866; 74/865; 74/870; 74/877
[58] Field of Search ................. 74/866, 856, 861, 851, 74/863, 865, 870, 877, 752 D, DIG. 6

[56] References Cited

U.S. PATENT DOCUMENTS

| | | | |
|---|---|---|---|
| 3,420,328 | 1/1969 | Johnson et al. | 74/861 X |
| 3,628,642 | 12/1971 | Ravenel | 74/866 X |
| 3,688,609 | 9/1972 | Friedline | 74/866 |
| 3,726,159 | 4/1973 | Mizote | 74/866 |
| 3,733,930 | 5/1973 | Mizote | 74/866 |
| 3,739,661 | 6/1973 | Harrison | 74/866 |
| 3,922,933 | 12/1975 | Sakai et al. | 74/866 |
| 4,039,061 | 8/1977 | Pruvot et al. | 74/866 X |

FOREIGN PATENT DOCUMENTS

2748227 6/1978 Fed. Rep. of Germany ............. 74/863
2709235 9/1978 Fed. Rep. of Germany ............. 74/866

Primary Examiner—Leslie Braun
Attorney, Agent, or Firm—Finnegan, Henderson, Farabow, Garrett & Dunner

[57] ABSTRACT

For generating a transmission shift control command in accordance with the operating conditions of a vehicle engine, from the point of view of improving fuel economy of the engine, a transmission shift control device has a throttle sensor which detects the throttle opening to produce a throttle signal, an engine speed sensor which detects the engine speed to produce an engine speed signal, a throttle comparator which compares the throttle signal with a reference signal, an engine speed comparator which compares the engine speed signal with a reference signal, and a switching circuit which generates an upshift command or a downshift command on the basis of signals from these comparators, these commands being sent to the transmission of the vehicle, or to a display visible to the driver.

5 Claims, 5 Drawing Figures

VEHICLE TRANSMISSION SHIFT CONTROL APPARATUS

BACKGROUND OF THE INVENTION

The present invention relates to a device for controlling the transmission of a vehicle, and, more particularly, to a device for controlling the shift timing of the transmission of a vehicle in accordance with the operating conditions of the engine and the vehicle, from the standpoint of maximizing fuel economy and power output performance.

In a vehicle equipped with a manual transmission and a mechanical clutch, the fuel economy is generally expressed by the following formula:

$$Ef = Sv \times wf \times et \times 1000/(fb \times Nr) \quad (1)$$

where:
Ef is the fuel economy, in km/liter;
Sv is the vehicle speed, in km/hour;
wf is the specific gravity of the fuel, in g/cm$^3$;
et is the mechanical efficiency of the gear train;
fb is the brake specific fuel consumption, in g/PS.hour; and
Nr is the required power, in PS.

In order to maximize the fuel economy, under the condition that the vehicle speed Sv and the required power Nr are constant, it is necessary to minimize the value fb/(wf×et). In this case, since the specific gravity of the fuel wf and the mechanical efficiency of the gear-train et can be taken as being substantially constant, regardless of the operating conditions of the engine, it is necessary to minimize the specific fuel consumption fb, in order to maximize the fuel economy.

Now, because the brake specific fuel consumption fb varies in relation to engine speed and engine torque, better fuel economy will be achieved if engine speed is controlled while maintaining the required power. In order to change engine speed while maintaining the vehicle speed Sv and the required power Nr at constant values, it is necessary to change the transmission ratio, i.e. to effect shifting of the transmission. Therefore, if shifts in the transmission ratio are performed properly in accordance with the vehicle load and engine speed, the fuel economy of the vehicle can be improved.

SUMMARY OF THE INVENTION

Based upon recognition of the above facts, it is an object of the present invention to provide a device for controlling the shift timing of the transmission which provides the optimum shifting of the transmission, with a view to improving the fuel economy of the vehicle by monitoring the engine speed and the throttle opening and analysing the results obtained.

According to the present invention, the abovementioned object is attained by, in a vehicle which is driven by an engine via a transmission, a transmission shift control device, comprising: a throttle sensor which detects a value which represents the throttle opening of the engine and generates a throttle signal; an engine speed sensor which detects a value which represents the engine rotational speed and generates an engine speed signal; a throttle comparator which receives at least one reference signal which it compares with the throttle signal which it receives from said throttle sensor; an engine speed comparator which receives a reference signal and compares it with the engine speed signal which it receives from said engine speed sensor; and a switching circuit means which generates either an upshift command or a downshift command and sends it to the transmission on the basis of signals fed to it from said first and second comparators.

According to an additional feature of the present invention, said upshift and downshift command signals may be employed to operate an actuator which changes over shifting of a sub-transmission incorporated in a manual transmission.

According to a further additional feature of the present invention, said upshift and downshift command signals may be indicated on the instrument panel in front of the driver of the vehicle by a shift indicator.

BRIEF DESCRIPTION OF THE DRAWINGS

The present invention will become more clearly understood from the following description of several preferred embodiments, when taken in conjunction with the appended drawings. However, it should be particularly noted that the embodiments and the drawings are given for the purposes of illustration only, and none of their particular features should be taken as limitative of the present invention, whose scope is only to be defined by the claims. In the drawings:

DESCRIPTION OF THE PREFERRED EMBODIMENTS

Figure 1:
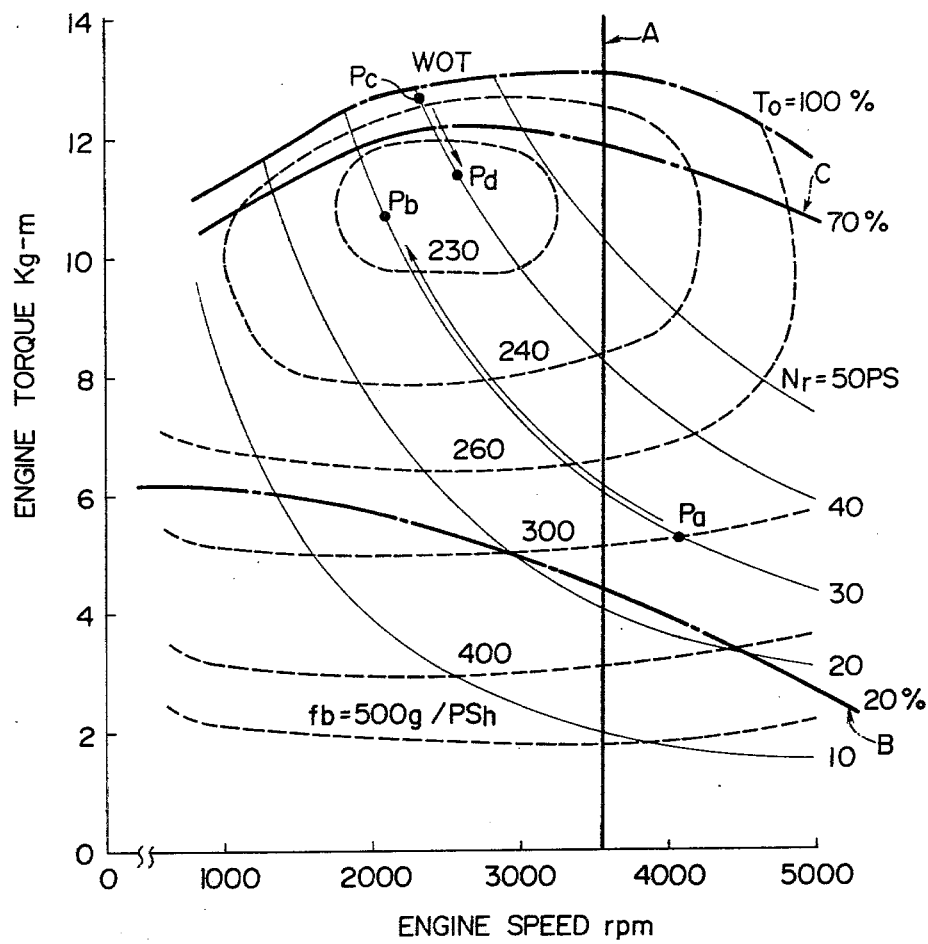
FIG. 1 is a graph of engine torque against speed, showing lines of equal brake specific fuel consumption, lines of equal output power, and lines of equal throttle opening.

Prior to the explanation of the preferred embodiments of the present invention, the optimum transmission shift timing will be explained by reference to the graph of FIG. 1. In this graph, the broken lines are lines of equal brake specific fuel consumption, the solid lines are lines of equal output power, and the chain lines are lines of equal throttle opening. The more the brake specific fuel consumption is reduced, the more the fuel economy is improved. Therefore it is desirable that the engine should be operated within the range within which the brake specific fuel consumption fb is as small as possible, while maintaining the required power Nr. For example, if the engine is operated at required power Nr of 30 PS and at an engine speed of 4000 rpm, namely at the point Pa in FIG. 1, then the value of the brake specific fuel consumption is 300 g/PS.h. However, if the engine speed is reduced to about 2000 rpm with the required power being maintained by means of an upshift of the transmission, the engine will be operated at a point Pb, whereby the value of the brake specific fuel consumption fb is reduced to about 230 g/PS.h. As another example, if the engine is operated at required power Nr of 40 PS and engine speed of about 2300 rpm, namely at the point Pc in FIG. 1, the value of the brake specific fuel consumption fb is about 260 g/PS.h. However, if the engine speed is increased to about 2600 rpm with the required power being maintained by means of a downshift of the transmission, the engine will be operated at a point Pd, whereby the value of the brake specific fuel consumption is reduced to about 230 g/PS.h.

Therefore, the transmission shift control device of the present invention is adapted to generate either an upshift command or a downshift command, so as to operate the engine within the operating range within which the brake specific fuel consumption fb is the smallest possible.

Figure 2:
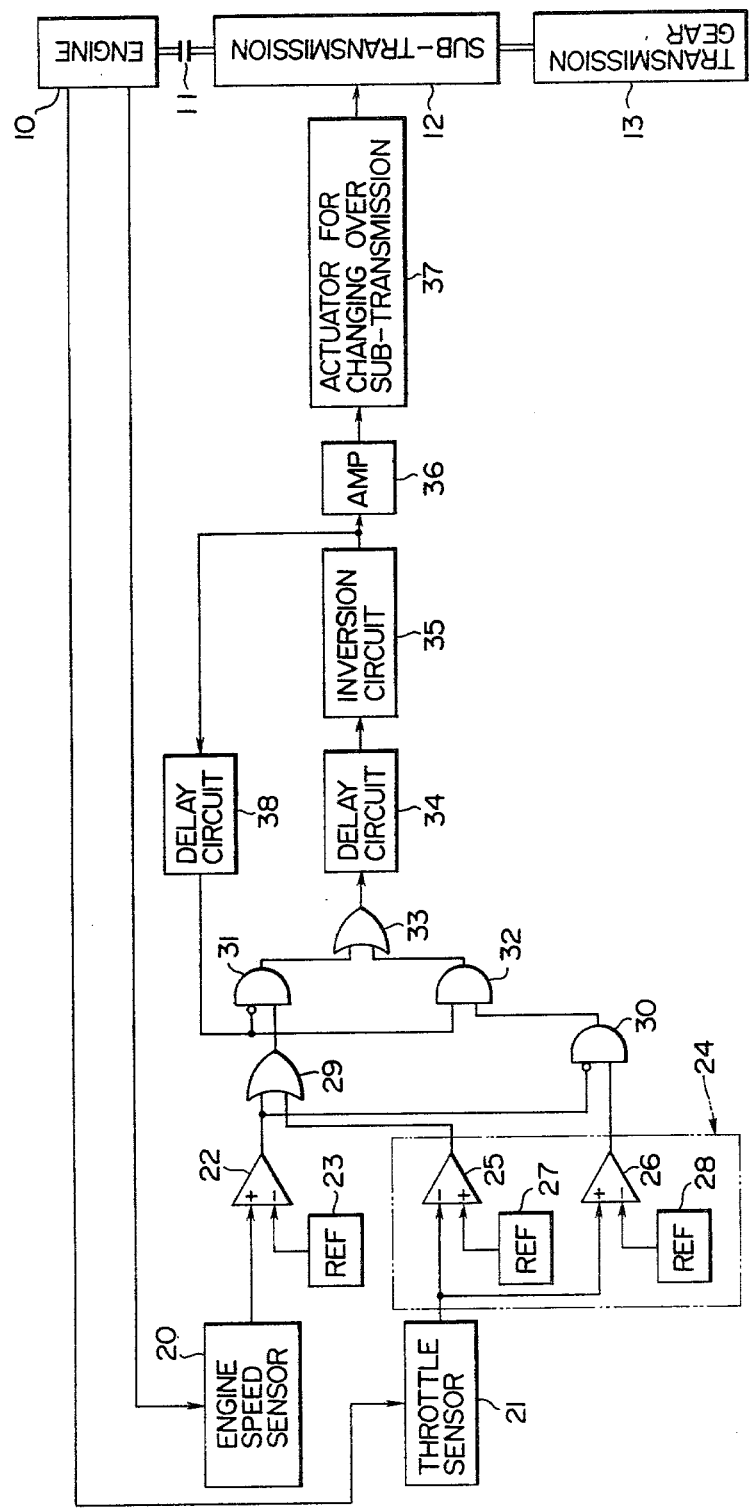
FIG. 2 is a diagrammatic view of an embodiment of the present invention which is adapted to change over a sub-transmission incorporated in a manual transmission automatically by means of a transmission shift control device according to the present invention.

Referring now to FIG. 2, the diagrammatic view of an embodiment of the present invention herein shown is adapted to change over a sub-transmission incorporated in a manual transmission automatically by means of a transmission shift control device according to the present invention. In FIG. 2, reference numeral 10 denotes the engine of the vehicle. Rotational power taken from the crankshaft of the engine 10 is transmitted by way of a mechanical clutch 11 to a sub-transmission 12, and is further transmitted therefrom to a gear transmission 13, from which it is further transmitted to the axle of the vehicle, where it drives the wheels of the vehicle.

The sub-transmission 12 may comprise a two-stage transmission gear system, which is per se known in the art, and the gear transmission 13 may be a conventional four-speed stage transmission such as a gearbox. Therefore, the combination of the speed stages of the transmission and the sub-transmission can provide 2×4=8 speed stages.

The transmission shift control device includes an engine speed sensor 20 and a throttle sensor 21. The engine speed sensor 20 is adapted to detect a value representing the engine rotational speed, for example the rotational speed of the shaft of the distributor incorporated in the engine ignition system, and to generate an electrical signal, henceforth called the engine speed signal (which in this embodiment is a voltage signal) according to this detected value. Likewise, the throttle sensor 21 is adapted to detect a value representing the throttle opening in the engine inlet system, for example the opening of the throttle valve, and to generate an electrical signal, henceforth called the throttle signal (which in this embodiment is a voltage signal) according to this detected value.

The engine speed signal provided by the engine speed sensor 20 is supplied to the "+" terminal of an engine speed comparator 22, which further receives at its "−" terminal a reference signal from a reference signal source 23, and generates a "1" signal output when the voltage at its "+" terminal is greater than the voltage at its "−" terminal, and a "0" signal otherwise. In this embodiment, this comparator comprises an operational amplifier. For example, if the reference voltage source 23 is set to generate a reference voltage which corresponds to engine revolutions of 3500 rpm, the engine speed comparator 22 generates a "1" signal only when the engine speed is higher than 3500 rpm.

The throttle signal generated by the throttle sensor 21 is supplied to a throttle comparator 24, which includes first and second comparators 25 and 26. The throttle signal generated by the throttle sensor 21 is supplied to both the "−" terminal of the first comparator 25 and to the "+" terminal of the second comparator 26.

The first comparator 25 receives a reference signal from a reference voltage source 27 at its "+" terminal, and generates a "1" signal when the voltage at its "+" terminal is higher than the voltage at its "−" terminal, while it generates a "0" signal when the voltage at its "+" terminal is lower than the voltage at its "−" terminal.

For example, if the reference voltage source 27 is set to generate a reference voltage signal corresponding to a throttle opening which is 20% of the full throttle opening, the first comparator 25 generates a "1" signal only when the throttle opening is smaller than 20%.

The second comparator 26 receives a reference signal from a reference voltage source 28 at its "−" terminal, and generates a "1" signal when the voltage at its "+" terminal is higher than the voltage at its "−" terminal, while it generates a "0" signal when the voltage at its "+" terminal is lower than the voltage at its "−" terminal.

For example, if the reference signal from the reference voltage source 28 corresponds to a throttle opening which is 70% of the full throttle opening, the second comparator 26 generates a "1" signal only when the throttle opening is larger than 70%.

Both the output signal of the engine speed comparator 22 and the output signal of the first comparator 25 are supplied to a first OR circuit 29. The output signal of the engine speed comparator 22 is also supplied to a negation input terminal of a first INHIBIT gate 30, which is also supplied with the output signal of the second comparator 26 at its other input terminal. The output signal of the first OR gate 29 is supplied to an input terminal of a second INHIBIT gate 31, the output signal of which is supplied to an input terminal of a second OR gate 33. The output signal of the first INHIBIT gate 30 is supplied to an input terminal of an AND gate 32, the output signal of which is supplied to the other input terminal of the second OR gate 33. The output signal of the second OR gate 33 is supplied to the input terminal of an inversion circuit 35 by way of a delay circuit 34.

The inversion circuit 35 in this embodiment, for example, comprises a FLIPFLOP circuit, which is inverted from the set state to the reset state, or from the reset state to the set state, when a "1" signal is supplied to its input terminal. That is, when the inversion circuit receives a "1" signal at its input terminal, its output signal is inverted, to "0" if it was "1", and to "1" if it was "0".

The output signal of this inversion circuit 35 is supplied to an amplifier 36, is amplified therein, and is then fed to an actuator 37 for changing over the sub-transmission. The actuator 37, for example, comprises a solenoid, which changes over the sub-transmission 12 to the high speed stage when a "1" signal is supplied to it—i.e., when it is energized—while it changes over the sub-transmission 12 to the low speed stage when a "0" signal is supplied to it—i.e., when it is not energized. Furthermore, the output signal of the inversion circuit 35 is supplied to the negation input terminal of the second INHIBIT gate 31 and also to the other input terminal of the AND gate 32 by way of a delay circuit 38, which is adapted to produce a time delay corresponding to the time interval from the changing over of the inversion circuit 35 to the actual shift change of said sub-transmission.

During the operation of the vehicle, let it be assumed that the sub-transmission 12 is in the low speed stage, namely that the inversion circuit 35 is generating a "0" signal. In this case, if the engine speed becomes higher than the predetermined value, i.e. 3500 rpm in this embodiment, and therefore if the engine speed comparator 22 gives a "1" signal to the first OR gate 29, this first OR gate 29 gives a "1" signal to the second INHIBIT gate 31. At this time the negation input terminal of the second INHIBIT gate 31 is receiving a "0" signal from the inversion circuit 35, so that the second INHIBIT gate 31 gives a "1" signal to the second OR circuit 33. Therefore the second OR circuit 33 gives a "1" signal to the inversion circuit 35 by way of the delay circuit 34. When the inversion circuit 35 receives this "1" signal, it gives a "1" signal to the amplifier 36, so that the actuator 37 is now energized and changes over the sub-transmission to the high speed stage.

When the sub-transmission 12 has been changed over from the low speed stage to the high speed stage, the engine is operated at a speed lower than that before the shifting, owing to the reduction of the speed reduction ratio. Therefore, the engine operating condition is shifted, for example, along the line of 30 PS from the point Pa toward the point Pb as seen in FIG. 1, thereby improving the brake specific fuel consumption for the same speed and load operation of the vehicle.

The abovementioned shifting from the low speed stage to the high speed stage is also done, in the same way, when the first comparator 25 generates a "1" signal, in other words when the throttle opening becomes smaller than the predetermined value, which is, in this embodiment, 20% of the full opening.

If the engine speed is lower than the predetermined value, the engine speed sensor 20 is giving a "0" signal, and if the throttle opening becomes larger than the predetermined value, which is, in this embodiment, 70% of the full opening, then the second comparator 26 generates a "1" signal, and therefore the first INHIBIT gate 30 generates a "1" signal and supplies it to the AND gate 32. Thus, if the transmission 12 is in the high speed stage, because the other input terminal of said AND gate 32 is also receiving a "1" signal from the inversion circuit 35, the AND gate 32 generates a "1" signal and supplies it to the second OR gate 33. As a result, the second OR gate 33 again generates a "1" signal and gives it to the inversion circuit 35 by way of the delay circuit 34. When the inversion circuit 35 receives this "1" signal, it supplies a "0" signal to the amplifier 36. Therefore the actuator 37 is de-energized, so that the sub-transmission 12 is changed over from the high speed stage to the low speed stage. Thus the engine now operates at a speed higher than that before the shifting, due to the increase of the reduction ratio. Thus the engine operating condition is shifted, for example, along the line of 40 PS from the point Pc toward the point Pd, as seen in FIG. 1, thereby improving the brake specific fuel consumption for the same speed and load operation of the vehicle.

In accordance with this structure that the energization or de-energization of the actuator 37 which changes over the sub-transmission between the high and the low stages is controlled on the basis of the signals generated by the engine speed comparator 22 and the throttle comparator 24, the engine is always operated in the range which provides a desirable brake specific fuel consumption, such as the range limited by the lines A, B, and C in the present embodiment.

In this connection, the delay circuits 34 and 38 operate so as to obviate occurrence of hunting of the inversion circuit 35 and the subsequent system.

Figure 3:
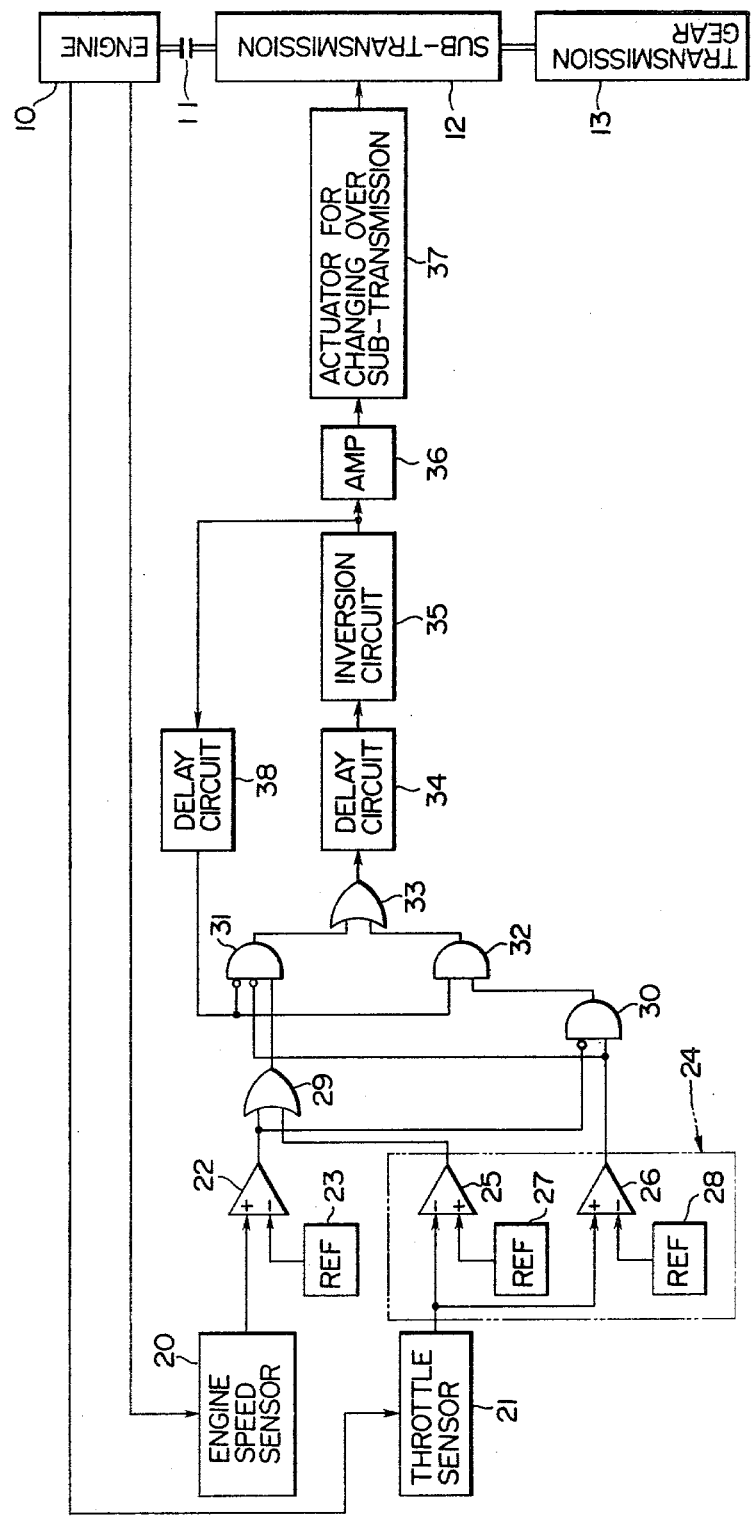
FIG. 3 is a diagrammatic view of a modified embodiment of the device shown in FIG. 2.

FIG. 3 shows a modification of the embodiment shown in FIG. 2. In this modification, the second INHIBIT gate 31 is a three-input type INHIBIT gate having two negation input terminals and one input terminal. The additional negation input terminal is adapted to receive the output signal of the second comparator 26. In this case, the change over of the sub-transmission 12 from the low speed stage to the high speed stage is done only when the throttle opening is smaller than, for example, 70% of the full opening even when the engine speed is higher than, for example, 3500 rpm.

Figure 4:
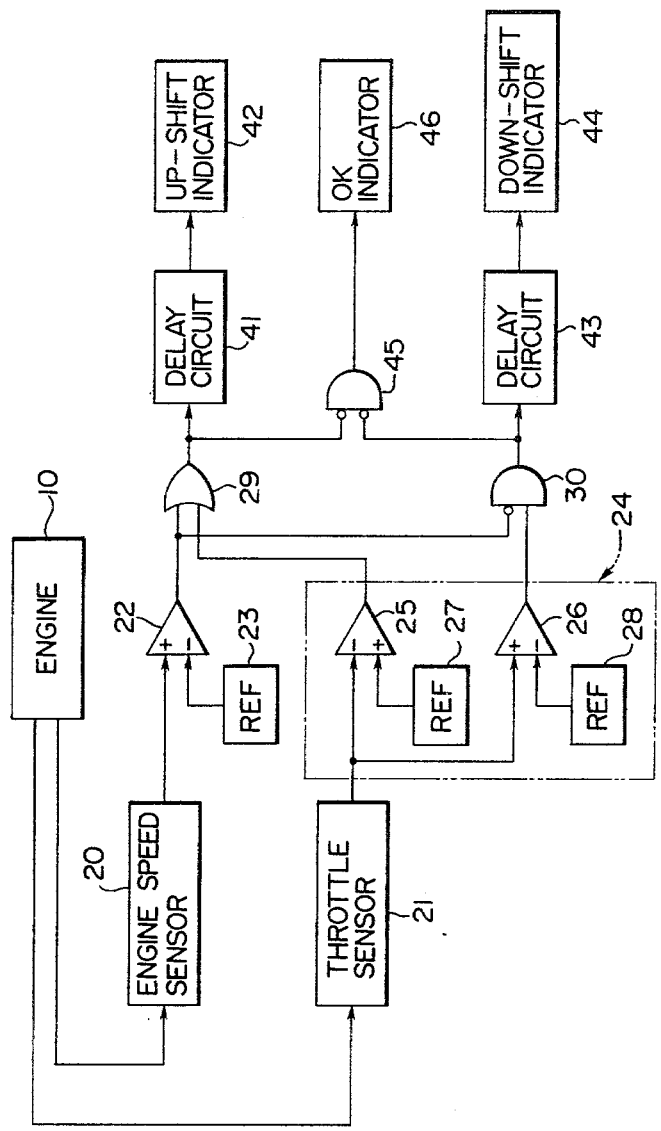
FIG. 4 is a diagrammatic view of an embodiment in which certain parameters of the transmission timing for a manual transmission or sub-transmission thereof are displayed to the vehicle driver by means of a transmission shift control device according to the present invention.

FIG. 4 is a diagrammatic view of an embodiment in which the shift timing for a manual transmission or a sub-transmission is displayed to the vehicle driver. In FIG. 4, the parts corresponding to those in FIG. 3 are designated by the same reference numerals as in FIG. 3. In this embodiment, the output signal of the first OR gate 29 is introduced to an upshift indicator 42 by way of a delay circuit 41, and the output signal of the first INHIBIT gate 30 is introduced to a downshift indicator 44 by way of a delay circuit 43. Furthermore, the output signals of the first OR gate 29 and of the first INHIBIT gate 30 are supplied together to a NOR gate 45, the output signal of which is supplied to an OK indicator 46. These indicators are adapted to, for example, light up to indicate respectively that upshift should be done, downshift should be done, or that the transmission is in the proper stage for optimum operation. In this embodiment, as in the embodiment shown in FIG. 2, when the engine speed is higher than, for example, 3500 rpm, or the throttle opening is smaller than, for example, 20% of the full opening, said OR gate 29 generates a "1" signal, so that the upshift indicator 24 lights up. By contrast, when the engine speed is lower than 3500 rpm and the throttle opening is larger than 70% of the full opening, the first INHIBIT gate 30 generates a "1" signal, so that the downshift indicator 44 lights up. Except in the abovementioned two cases, the OK indicator 46 lights up. Therefore, if the operator performs shifting of the sub-transmission or the transmission according to the indications of the upshift indicator 42 and the downshift indicator 44, the engine is operated, also, in the range limited by the lines A, B, and C in FIG. 1, in which the brake specific fuel consumption is small.

Figure 5:
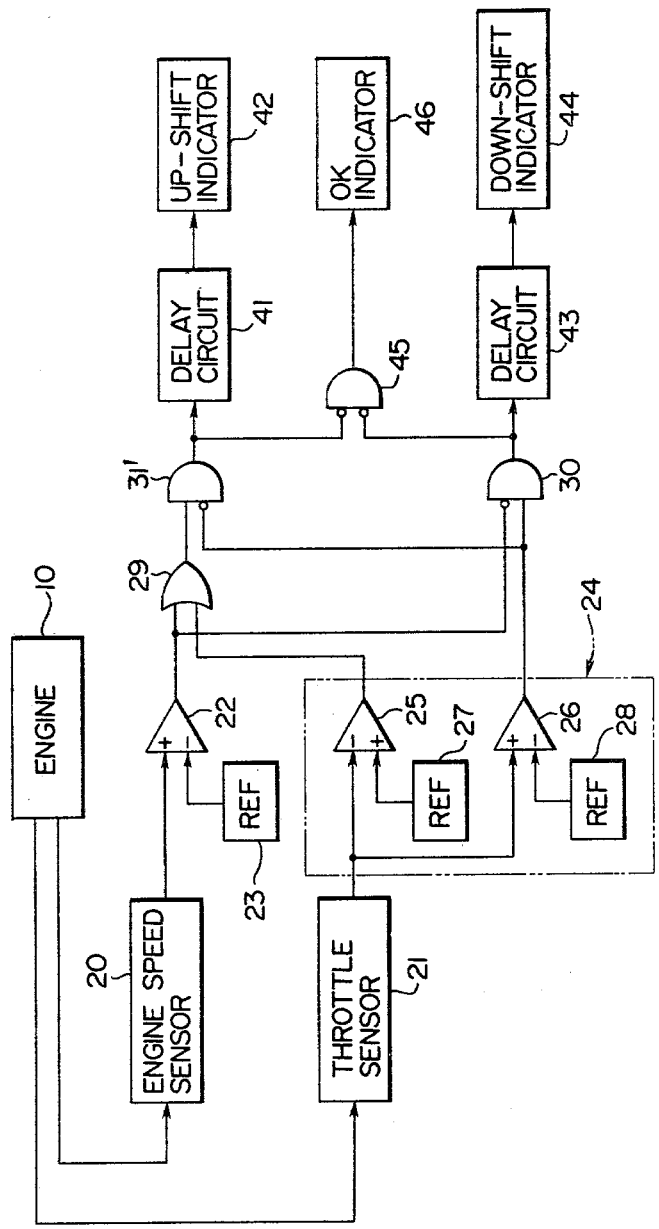
FIG. 5 is a diagrammatic view of a modified embodiment of the device shown in FIG. 4.

FIG. 5 shows a modification of the embodiment shown in FIG. 4. In FIG. 5, the parts corresponding to those in FIG. 4 are designated by the same reference numerals as in FIG. 4. In this embodiment, another INHIBIT gate 31' is disposed between the first OR gate 29 and the delay circuit 41. The input terminal and the negation terminal of this INHIBIT gate 31' receive respectively the output signal of the first OR gate 29 and the output signal of the second comparator 26, the output signal of this INHIBIT gate 31' being supplied to the delay circuit 41. Accordingly, in this embodiment, as in the embodiment shown in FIG. 3, only when the throttle opening is smaller than 70% of the full opening, the upshift indicator 42 is lighted even when the engine speed is higher than 3500 rpm.

Although the invention has been shown and described with reference to some preferred embodiments thereof, it should be understood that various changes, modifications, and/or omissions can be made to the form and the content of the embodiments thereof, by a person skilled in the art, without departing from the scope of the invention. Therefore it is desired that the scope of protection granted, and the monopoly protection afforded by Letters Patent, should be defined, not by any specific details of the purely illustrative embodiments shown, or of the drawings, but only by the accompanying claims, which follow.

What is claimed is:

1. In a vehicle which is driven by an engine via a transmission, a transmission shift control device for minimizing the brake specific fuel consumption of the vehicle, said device comprising:
   a throttle sensor which detects the value which represents the throttle opening of the engine and generates a throttle signal;
   an engine speed sensor which detects a value which represents the engine rotational speed and generates an engine speed signal;
   a throttle comparator which receives at least one reference signal which it compares with the throttle signal which it receives from said throttle sensor and generates a signal resulting from the comparison;
   an engine speed comparator which receives a reference signal and compares it with the engine speed signal which it receives from said engine speed sensor and generates a signal as a result of the comparison; and
   a switching circuit means which generates either an upshift command or a downshift command and sends it to the transmission on the basis of said signals fed to it from said throttle and engine speed comparators, said upshift command being generated when said brake specific fuel consumption of said vehicle is lowered by said engine speed being reduced while maintaining the engine output power constant, and said downshift command being generated when said brake specific fuel consumption is lowered by said engine speed being increased while maintaining the engine output power constant.

2. A transmission shift control device as in claim 1, wherein said switching circuit means is adapted to generate the upshift command when the engine speed is higher than a predetermined value or when the throttle opening is smaller than a first predetermined value, and to generate the downshift command when the engine speed is lower than the predetermined value and the throttle opening is larger than a second predetermined value which is larger than said first predetermined value.

3. A transmission shift control device as in claim 1, wherein said switching circuit means is adapted to generate the upshift command when the throttle opening is smaller than a first predetermined value or when the engine speed is higher than a predetermined value and the throttle opening is smaller than a second predetermined value which is larger than said first predetermined value, and to generate the downshift command when the throttle opening is larger than said second predetermined value and the engine speed is lower than said predetermined value.

4. A transmission shift control device as claimed in any of claims 1, 2, or 3, wherein said upshift command and downshift command are supplied to an actuator for changing over a sub-transmission incorporated in a manual transmission.

5. A transmission shift control device as claimed in any of claims 1, 2, or 3, wherein said upshift command and downshift command are supplied to a transmission shift display indicator.

* * * * *